June 2, 1925.
H. F. HARVEY
AUTOMATIC TIRE PUMP
Filed April 2, 1924
1,539,900
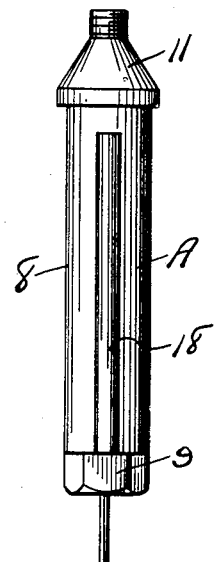
Fig. 1.
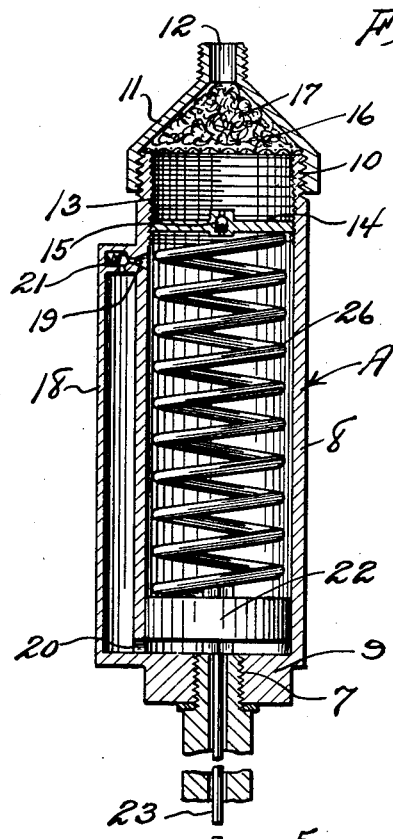
Fig. 2.
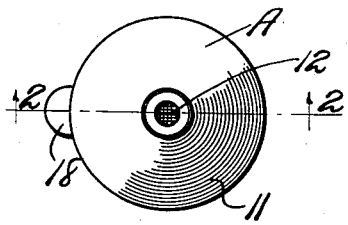
Fig. 3.
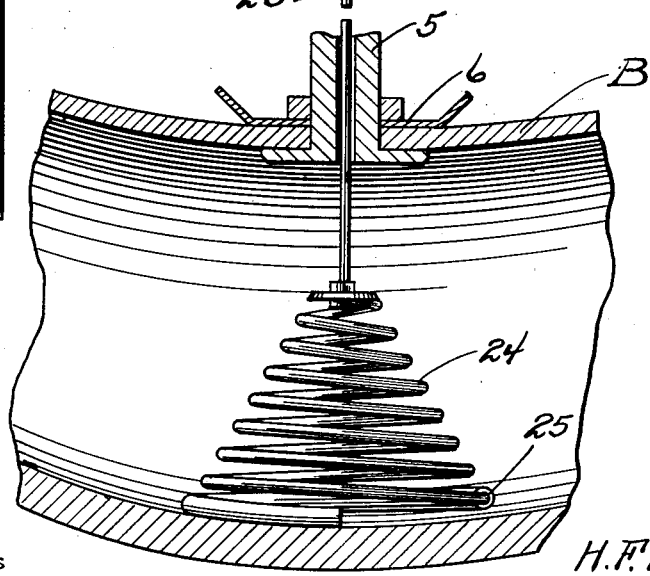
Witnesses
Inventor
H. F. Harvey
By Richard B. Owen,
Attorney Patented June 2, 1925.

1,539,900

UNITED STATES PATENT OFFICE.

HARRY F. HARVEY, OF PROSPER, MINNESOTA.

AUTOMATIC TIRE PUMP.

Application filed April 2, 1924. Serial No. 703,758.

*To all whom it may concern:*

Be it known that I, HARRY F. HARVEY, a citizen of the United States, residing at Prosper, in the county of Fillmore and State of Minnesota, have invented certain new and useful Improvements in Automatic Tire Pumps, of which the following is a specification.

This invention appertains to automobile appliances and the primary object of the invention is to provide novel means for automatically inflating the pneumatic tire for an automobile, while the automobile is in use, thereby obviating the necessity of inflating the tires as now generally employed.

A further object of this invention is the provision of a novel pump operatively connected to the pnematic tire of an automobile embodying a plunger for forcing air from the pump into the tire, which is normally held at one end of the pump by a relatively heavy coil spring, and which is adapted to be forced into the pump against the tension of the said spring means by the weight of the automobile upon each revolution of the tire, when the same is below its normal air pressure.

A further object of this invention is the provision of an automatic pump for automobile tires embodying a cylinder connected with the tire filling valve casing, a plunger reciprocally mounted within the cylinder and a plunger rod connected to the plunger and extending through the casing into the tire, the rod having connected thereto a helical cushioning spring, the outer convolution of which is normally in engagement with the inner surface of the tread of the tire.

A further object of this invention is the provision of novel means for introducing the air into the pump and novel means for straining the air as the same enters the pump.

A further object of this invention is the provision of novel means for mounting the plunger engaging spring in the cylinder of the pump, whereby the pump will operate, when the air in the tire is below a predetermined pressure.

A still further object of the invention is to provide an improved automatic air pump of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed, and illustrated in the accompanying drawings, in which drawings.

Figure 1 is a side elevation of the improved pump,

Figure 2 is a longitudinal section through the improved pump taken on the line 2—2 of Figure 3 and illustrating the pump connected with an automobile tire, and Figure 3 is a top plan view of the improved pump.

Referring to the drawings in detail, wherein similar reference characters designate corresponding parts throughout the several views, the letter A generally indicates the improved tire pump and B an automobile tire, with which the same can be associated. The automobile tire B is provided with the usual tire filling valve casing 5, which is connected with the tire B in the usual manner as indicated by the reference character 6. The outer end of the tire filling valve casing 5 is provided with a reduced externally threaded extension 7 which is adapted to be received by the improved pump A, as will be hereinafter more fully described.

The improved automatic air pump A comprises a cylinder 8 having a lower wall 9 which is provided with a threaded axial opening for receiving the extension 7. By this arrangement, it can be seen that the bore of the valve stem casing 5 communicates with the outer end of the cylinder 8. The opposite end of the cylinder 8 is left open and is provided with external threads 10 for receiving a conical cap 11 having an air entrance opening 12 formed therein. The inner surface of the cylinder adjacent to the opening thereof is provided with internal threads 13 for reception of an adjustable disk 14 which is provided with a spring pressed one-way valve 15, which permits the entrance of the air into the casing or cylinder, but prevents the exit of the air from the casing.

In order to permit the straining of the air as the same enters into the cylinder so as to prevent the entrance of dust, dirt and the like into the tire a disk of relatively fine wire mesh 16 is placed over the open end of the cylinder and suitable straining material such as raw cotton 17 or the like is placed in between the wire mesh 15 and the cap 11. Formed integral with the outer surface of the wall of the cylinder 8 is an air way 18 and this air way communicates respectively with the opposite ends of the cylinder by parts 19 and 20. The part 19 is provided with a valve seat, on which is adapted to normally rest a spring pressed ball valve 21. This spring pressed ball valve permits the entrance of air into the channel 18 through the outer end thereof but prevents the flow of air into the cylinder from the passageway at the inner end thereof past said valve seat and way 19.

Reciprocally mounted within the cylinder 8 is a piston 22 and this piston has attached thereto a piston rod 23 which slidably extends through the bore of the valve stem casing 5 into the tire B. The rod 23 is of a diameter considerably less than the diameter of the bore of the filling valve stem casing 5 so as to permit the free flow of air through said bore. The inner end of the rod 23 has attached thereto a helical cushioning spring 24, the convolutions of which gradually decrease in diameter toward said rod. The outer convolution of the spring 24 is adapted to engage the inner surface of the tire B at the periphery or tread thereof and this convolution is provided with a rubber or like covering 25 so as to prevent injury to said tire by the spring.

A relatively heavy expansion spring 26 is arranged within the cylinder 8 and one end of the spring engages the piston 22 so as to normally urge the piston toward the wall 9 of the cylinder and its opposite end is in engagement with the adjustable disk 14. It is obvious that the tension of the spring can be adjusted by moving the plate 14 toward or away from the piston 22. Thus if the normal pressure of the air in the tire should be 60 pounds the tension of the spring can be adjusted to that tension by moving the plate 14 inward or outward, as the case may be.

In operation of this improved pump, it can be seen that if the air pressure in the tire B is less than 60 pounds, that the tire will be compressed, as the wheel turns, which will of course force the rod 23 and the piston 22 into the cylinder. This will compress the air in the cylinder and force the same into the channel 18 past the one-way valve 21. In view of the fact that the valve 15 is a one-way valve, the air would be prevented from escaping out of the cylinder. When the point of contact of the spring 24 with the tire passes over the ground, it is obvious that the spring 26 will return the piston 22 to its normal position. This will force air under pressure through the valve stem casing 5 into the tire. This movement will also open the one-way valve 15 and suck air into the cylinder through the cap 11. This operation is continued until the air pressure reaches the desired point, at which time the pressure of the air and the spring 26 become equalized and thus further operation of the pump will be prevented.

From the foregoing description it can be seen that I have provided an improved means for automatically filling a tire with air during the use thereof.

Changes in details may be made without departing from the spirit or the scope of this invention, but:

What I claim as new is:

1. The combination with an automobile pneumatic tire, of an automatic pump for the tire embodying a cylinder having communication with the tire, a piston reciprocally mounted within the cylinder, an expansion spring of the desired tension arranged within the cylinder and engaging the said piston for normally urging the same to one end of the cylinder, means for permitting the entrance of air into the cylinder from one end thereof and for preventing the exit of air through said end, a piston rod operatively connected to the piston and extending into the tire, and a helical cushioning spring carried by the rod for engaging the inner surface or tread of the tire, as and for the purpose specified.

2. The combination with an automobile pneumatic tire, of a tire valve filling casing connected therewith provided with a longitudinally extending way therethrough, of means for automatically filling the tire with air comprising a cylinder operatively connected to said filling valve casing, a plunger reciprocally mounted within the cylinder, a rod operatively connected to the plunger reciprocally mounted within the filling valve casing and extending into the tire, a helical spring connected to the outer end of the rod, the convolutions of the spring gradually increasing in diameter toward the outer end thereof, the outermost diameter of the spring engaging the inner surface of the tire at the tread thereof, a protecting cover formed at the outer convolution of the spring, a relatively heavy coil spring arranged within the cylinder and engaging said plunger for normally urging the same at one end of the cylinder, a one-way valve carried by one end of the cylinder for permitting the entrance of air into the cylinder, and a way for connecting the opposite ends of the cylinder together, the way having a one-way valve therein for permitting the flow of air through the way in one direction.

3. The combination with a pneumatic tire having a tire filling valve casing connected therewith, of means for filling the tire with air comprising a pump including a cylinder connected with said filling valve casing, a cap carried by the inner end of the pump, straining material fitted in said cap, a piston reciprocally mounted within the cylinder, an expansion spring arranged within the cylinder engaging the piston for normally holding the piston at one end of the cylinder, a piston rod connected to the piston and extending through the filling valve casing into the tire, a way for operatively connecting the opposite ends of the cylinder together, the way having disposed therein a one-way valve for controlling the flow of air therethrough, a disk adjustably mounted in the cylinder engaging the spring for adjusting the tension thereof, and a one-way valve carried by said disk.

In testimony whereof I affix my signature in presence of two witnesses.

HARRY F. HARVEY.

Witnesses:
  KARL CHRISTOPHER,
  LEE LANE.